UNITED STATES PATENT OFFICE.

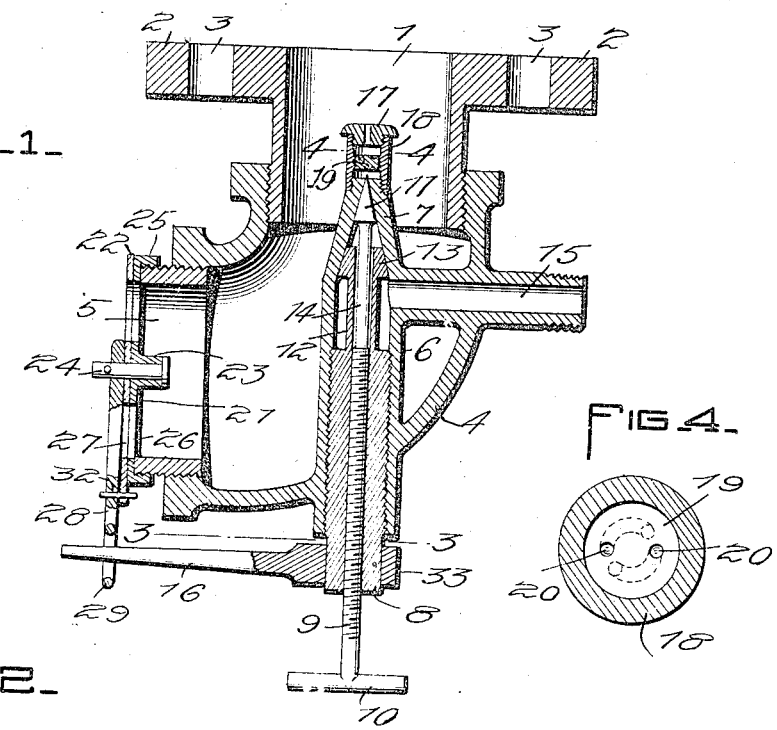

OSCAR KUSTEL, OF ONTARIO, CALIFORNIA.

CARBURETER.

1,184,541.  Specification of Letters Patent.  Patented May 23, 1916.

Application filed September 24, 1915. Serial No. 52,395.

*To all whom it may concern:*

Be it known that I, OSCAR KUSTEL, a citizen of the United States, and a resident of Ontario, in the county of San Bernardino and State of California, have invented a new and useful Improvement in Carbureters, of which the following is a specification.

My invention is an improvement in carbureters, and has for its object to provide mechanism of the character specified, wherein a valve casing is provided, having a valve for controlling the inlet of air and having a feed screw for controlling the inlet of the fuel, and wherein the feed screw and the air inlet valve are connected in such manner that they will move together, and wherein either may be adjusted with respect to the moving means independently of the other.

In the drawings:—Figure 1 is a vertical section through the carbureter, Fig. 2 is a front view of the indicating mechanism, Figs. 3 and 4 are sections on the lines 3—3 and 4—4, respectively, of Fig. 1, and Fig. 5 is a perspective view of Fig. 2 with the parts separated.

The present embodiment of the invention comprises a two part casing, consisting of a nipple 1, having oppositely extending lugs 2, provided with openings 3 for permitting the nipple to be secured to the engine or to the manifold, and an elbow 4 having its ends internally threaded to engage the nipple 1, and to engage an externally threaded ring or casing 5.

A tubular valve casing 6 of approximately cylindrical form is provided in connection with the elbow 4, and at the axis of the nipple 1, when the said nipple is in place and the said casing extends through the convex wall of the elbow as shown, while the inner end is tapering as indicated at 7, and extends into the nipple 1 when the said nipple is in place. A feed screw 8 is threaded into the outer end of the casing, the said casing being internally threaded to receive the feed screw, and a valve stem 9 is threaded through the feed screw, the stem having a cross head or handle 10 at its outer end.

The valve 11 is tapering or conical as shown, and coöperates with a similarly shaped seat at the inner end of the tapering portion 7 of the casing. The feed screw 8 has an extension 12 at its inner end and this extension carries a tapering ring 13 at its inner end which fits the interior of the tapering portion 7 of the valve casing. It will be noted that a portion 14 of the stem is plain and reduced between the threaded portion and the valve 11, and this portion 14 of the stem does not fill the bore of the feed screw extension. An annular chamber is thus provided encircling the extension 12 of the feed screw, and between the same and the ring 13, and a pipe 15 extends from the casing 6 outwardly through the wall of the elbow, the outer end of the pipe being externally threaded as shown.

A handle 16 is connected with the outer end of the feed screw, in order to permit the same to be turned, and a spray cap 17 is connected to the inner end of the valve casing, by means of a tubular extension or sleeve 18. The inner end of the tapered portion 7 of the casing 6 is reduced and externally threaded for engagement by the adjacent end of the sleeve, and the spray cap 17 has a central opening and a reduced extension coaxial with the opening for engaging within the sleeve.

The sleeve 18 has a diaphragm 19 intermediate the ends thereof, and this diaphragm is provided with two ports or passages extending helically from the upper to the lower face, the said ports or passages 20 being oppositely arranged as shown, and on opposite sides of the center of the sleeve. The openings of the ports or passages at the inner face of the diaphragm are at opposite sides of the center and the openings at the outer faces of the diaphragm are also at opposite sides. The opening of each port or passage at the outer face of the diaphragm is adjacent to the opening of the other port or passage at the inner face, as indicated in Fig. 4.

The ring or casing 5 is the air intake for the carbureter, while the pipe 15 is the gasolene or fuel intake. The air intake is controlled by a valve mechanism, consisting of two disks 21 and 22. The disk 21 has an inwardly extending hub 23, and a headed pin 24 passes through the hub from within outward and through a central opening in the disk 22. The disks are thus journaled coaxially on the pin, and the disk 21 has a marginal flange 25, which is threaded on to the exterior of the ring 5. The disk 21 is thus fixed, while the disk 22 may rotate with respect to the disk 21. Two sectors 26 and 27 respectively are cut out from each disk, each sector being approximately a quadrant of the disk, and the two sectors of each disk are oppositely arranged. Thus each disk has openings corresponding to approximately half the effective area of the disk. The head of the pin 24 bears against the inner end of the hub 23, and the outer end passes beyond the outer face of the disk 22, and a lever 28 is arranged on the pin, and is held in place by a cotter pin as shown. This lever 28 has a loop or staple 29 at its lower end, through which extends the arm 16 before mentioned. The disk 22 has a segmental extension 30, which is provided with a series of openings 31, the said openings being arranged in the line of an arc concentric with the disk, and the lever 28 has an opening which is designed to register with any one of the openings 31, and a pin 32 is passed through the openings to hold the parts in adjusted position.

The arm 16 before mentioned, extends from the split hub 33, which is held on the lower end of the feed screw 8. This hub has two radial lugs 34, at its ends and a set screw 35 is passed through registering openings in the lugs and by means of the screw the ring or hub may be clamped on the feed screw. The hub has another arm 36, extending at a right angle to the arm 16, and the free end of the arm 36 is provided with a loop or eye 37.

The improved carbureter will feed fuel and air in precisely the proportions desired, and while the relative proportions may be varied by adjusting the mechanism, the proportions cannot vary when once set unless the mechanism is afterward changed. When once set, the carbureter will operate without the throttle, and no float is necessary for controlling the fuel. The feed of the fuel is regulated by the valve 11, while the air intake is regulated by the valve 22, the said valve being turned to cause the openings 27 to coincide or register more or less with the openings 26 as may be desired.

In operation, the air intake is regulated in accordance with conditions by turning the valve 22. This may be done by releasing the pin 32 after which the valve 22 may be turned with respect to the arm 28 and with respect to the disk 21. The flow of gasolene is regulated by means of the feed screw 8. This screw is set to feed the desired amount of fuel, the set screw 35 being loosened to permit the turning of the feed screw. When the fuel feed and the air intake have been adjusted to the proper amounts, the set screw 35 is tightened and the pin 32 is replaced. When a partial vacuum is created in the engine by the suction, air rushes in through the openings 26 and 27, and passes up around the valve casing. The partial vacuum in the element 1 of the casing will vaporize a portion of the fuel which passes the valve 11, and will carry the atomized fuel mixed with air into the engine. The greater the suction obviously the greater the amount of fuel atomized, and the fuel may be nicely controlled by means of the valve 11. The arrangement of the openings 20, that is, helical with respect to the long axis of the valve casing, imparts to the fuel a rotary or helical motion before passing through the opening of the spray cap 17. The greater the suction the greater the amount of mixture that is drawn in but the relative proportion of air and fuel will remain the same. The whirling effect imparted to the fuel by the passages 20 assists materially in vaporizing such fuel preliminary to its escape through the outlet of the cap 17, thereby facilitating the mixing of the fuel with the air before the entrance of the mixture into the manifold.

If it is desired to provide for a greater amount of fuel, the feed screw is lowered, thus permitting a greater amount of fuel to pass the element 13 which is in effect a valve coöperating with the interior of the casing 7 as its seat. The amount of air entering may be regulated independently of the amount of fuel by means of the pin 32. Whenever the air intake is adjusted without removing the pin 32, the valve 13 is also adjusted at the same time.

It will be obvious that when the lever 28 is moved in the direction of the arrow in Fig. 2 the arm 16 will be moved in a direction to move the valve 13 upward. That is, whenever the openings 26 are reduced in area, the amount of fuel fed is simultaneously reduced, and when these air intakes are increased or opened the feed of the fuel is also increased.

A suitable controlling mechanism is connected with the eye 37 of the arm 36. This arm comprising the hub 33 and the arms 16 and 36 is an angle arm. The connection with the arm 36 is such that the chauffeur may move the arm in either direction. When the arm is moved in one direction, the fuel feed and the air supply are simultaneously reduced, while when the arm is moved in the other direction the fuel and air supplies are simultaneously increased.

After the fuel feed is set for the amount of air required to make a proper mixture no further adjustment is necessary. If more speed is required the arm 36 is moved to allow more fuel to pass the two valves 13 and 11, and for less speed the arm 36 is moved in the opposite direction. The screw 10 may be turned to withdraw the valve 11 away from its seat until more of the fuel is obtained. As stated, the two valves 13 and 11 coöperate in regulating the supply of fuel.

It is obvious that by changing the position of the valves 13 and 11 any flow of fuel within the limits of the device can be obtained.

The valves 11 and 13 have their respective stems 9 and 8 provided with screw threads of different pitch, as for instance, the stem of the needle valve 11 has a thread of twenty to the inch. The stem of valve 13 has a thread of fourteen to the inch. If the operating lever 36 is moved through a distance of one-half a circle the valve 11 would be raised one-twenty-eighth of an inch and the valve 13 the same distance. If the operating lever is turned back the same half circle both valves will be closed. If more liquid fuel is wanted for an increase in feed the valve 11 is turned one complete turn and the valve will be lowered one-twentieth of an inch. Now if the operating lever is turned through one-half a circle, or through an angle of 180°, the valve 11 will be opened one twenty-eighth of an inch in addition to the one-twentieth already opened, and a greater flow of fuel is obtained. When the operating lever is brought back to close the valve valve 11 will not close entirely, remaining open one-twentieth of an inch but the valve 13 will be entirely closed, shutting off the flow of fuel.

I claim:

1. A carbureter comprising an elbow having at one end means for permitting it to be attached to the manifold, a ring casing detachably connected with the other end of the elbow, a disk having a marginal flange threaded on to the outer end of the ring and having a hub, a pin journaled in the hub, a second disk journaled on the pin outside the first disk, said disks having segmental openings adapted to register with each other, an arm journaled on the pin at the outer face of the outer disk, and having a detachable and adjustable connection with the said outer disk, a valve casing at the axis of the first-named end of the elbow, and having a lateral inlet extending through the elbow and adapted for connection with a source of fuel supply, a needle valve coöperating with the casing, a feed screw having a threaded engagement with the outer end of the casing and having a valve at its inner end coöperating with the casing, the feed screw having an axial bore, and the needle valve having a threaded engagement with the bore, an angle arm adjustably connected with the outer end of the feed screw, said angle arm consisting of portions extending at approximately a right angle with respect to each other, one of the portions extending toward the arm and the arm having a slot through which the portion extends, the other portion being adapted for connection with controlling means to operate the feed screw.

2. A carbureter comprising an elbow having at one end means for permitting it to be attached to the manifold, a ring casing detachably connected with the other end of the casing, a disk having a marginal flange threaded on to the larger end of the ring and having a hub, a pin journaled in the hub, a second disk journaled on the pin outside the first disk, said disks having segmental openings adapted to register with each other, an arm journaled on the pin at the outer face of the outer disk and having a detachable and adjustable connection with the said outer disk, a valve casing at the axis of the first-named end of the elbow, and having a tapered portion at its inner end and extending through the elbow, said casing having a lateral inlet at the junction of the tapering portion with the body of the casing, said inlet extending through the elbow and being adapted for connection with a source of fuel supply, a needle valve coöperating with the tapered end of the casing, a feed screw having a threaded engagement with the outer end of the casing and having a valve at its inner end coöperating with the tapering portion of the casing, the feed screw having an axial bore and the needle valve having a threaded engagement with the bore, an angle arm adjustably connected with the outer end of the feed screw, said angle arm consisting of portions extending at approximately a right angle with respect to each other, one of the portions extending toward the arm and the arm having a slot through which the portion extends, the other portion being adapted for connection with controlling means to operate the feed screw.

3. In a carbureter, a main casing having fuel and air inlets and an outlet for the mixture, an auxiliary casing having communication with the fuel inlet and provided with an outlet and an intermediate valve seat, a primary valve fitted within the auxiliary casing and having screw thread connection therewith, a secondary valve carried by the primary valve and having screw thread connection therewith, and operating means having adjustable connection with the primary valve.

4. In a carbureter, a main casing having fuel and air inlets and an outlet for the mixture, an auxiliary casing having communication with the fuel inlet and provided with an outlet and an intermediate valve seat, a primary valve fitted within the auxiliary casing and having a screw-thread connection therewith, means for adjusting the primary valve, a secondary valve carried by the primary valve, and having a reduced portion forming an annular passage intercommunicating with the inlet, operable means having connection with the primary valve, said secondary valve mounted within the primary valve and having screw thread connection therewith to admit of independent adjustment.

5. In a carbureter, a main casing having fuel and air inlets and an outlet for the mixture, an auxiliary casing having communication with the fuel inlet and provided with an outlet and an intermediate valve seat, a primary valve fitted within the auxiliary casing and having screw thread connection therewith, a secondary valve carried by the primary valve and having a screw thread connection therewith, air controlling means, a member having adjustable connection with the air controlling means, and an operable member forming connecting means between the said member and the primary fuel controlling valve.

6. In a carbureter, a main casing having fuel and air inlets and an outlet for the mixture, an auxiliary casing having connection with the fuel inlet and provided with an outlet and an intermediate valve seat, a primary valve fitted within the auxiliary casing and having screw thread connection therewith, a secondary valve carried by the primary valve and having screw thread connection therewith, air controlling means, a member having adjustable connection with the air controlling means, and an operable member having adjustable connection with the primary fuel controlling valve and forming connecting means between said primary fuel valve and the member having adjustable connection with the air controlling means.

OSCAR KÜSTEL.